Jan. 3, 1967  R. F. ARNOLDY  3,296,408
DUAL ARC WELDING
Filed Feb. 1, 1966
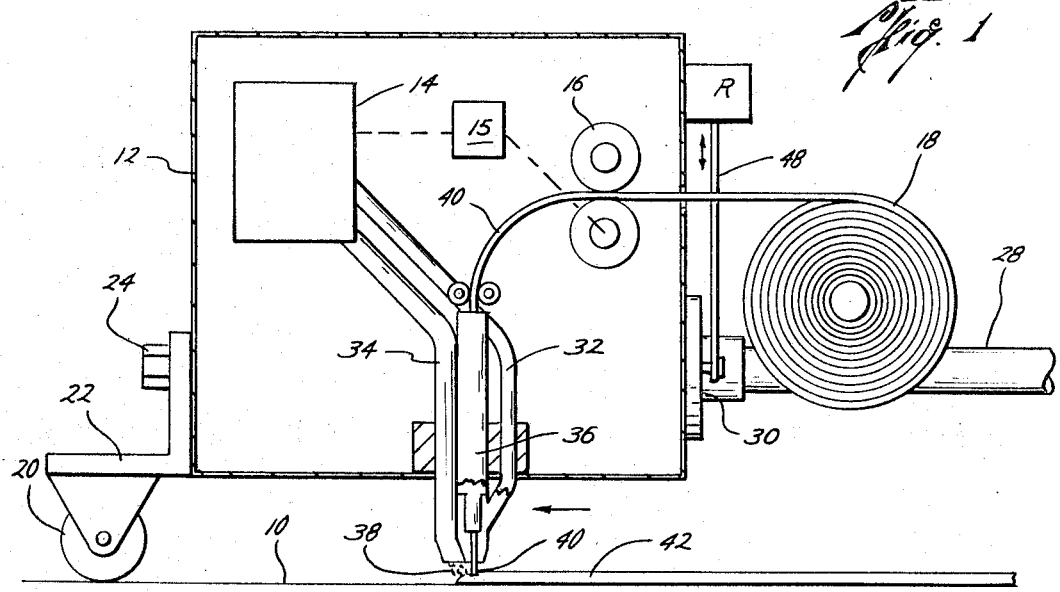
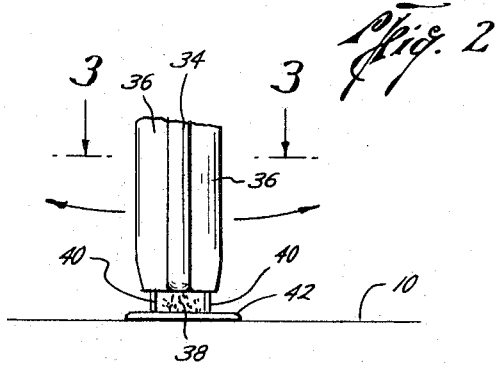
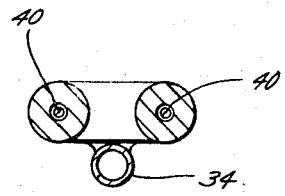
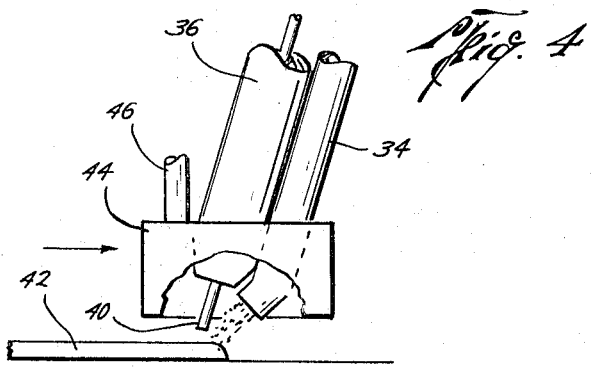
Roman F. Arnoldy
INVENTOR.
James F. Weiler
William A. Stout
BY Paul L. DeVerter II
Dudley R. Dobie Jr.
ATTORNEY

United States Patent Office 3,296,408
Patented Jan. 3, 1967

3,296,408
DUAL ARC WELDING
Roman F. Arnoldy, Houston, Tex., assignor to R.I. Patents, Inc., Houston, Tex., a corporation of Texas
Filed Feb. 1, 1966, Ser. No. 524,299
8 Claims. (Cl. 219—76)

The present invention relates to an improved method and apparatus of welding, cladding and the like employing elemental wire and granular metallic alloying materials, and more specifically relates to the use of a pair of electrodes and depositing the alloy granules between the electrodes as they are oscillated.

In the production of alloy welds in cladding, the use of a granular alloying material has become more prevalent because of the marked improvements in methods and mechanisms. Particular advantages in using granular alloying material lie in its relatively low cost and high speed, when compared to other cladding methods. The general area of granular metal welding is more fully discussed in my Patent No. 3,076,888.

Often it is desirable to produce an alloy weld when using metered wire and granular material in an automatic open arc, with or without gas shielding, but in the past this has produced serious problems. The amount and placement of the granular alloy material and its feed tube is quite critical because of the force of the arc tends to scatter the granular material, thus preventing its most effective utilization, and often resulting in a weld which does not meet the particular specifications sought. The open arc method of metered welding with or without gas shielding is particularly useful in depositing hard facing and high alloys where low fluidity makes slower freezing desirable. It has the additional advantages of full visibility to make good overlaps and control penetration, while eliminating the necessity for expensive special fluxes, or any flux at all.

Consequently, it is an object of the present invention to provide an improved metered arc welding method which is particularly suitable for use with semi-automatic equipment, and which overcomes the problem of the arc, in metered open arc welding, blowing away and dispersing the granular alloying material.

In accordance with the present invention, two metered welding electrodes are utilized simultaneously in automatic welding to produce two arcs and the metered granular alloying material is deposited on the surface to be welded between the arcs. In this manner, the granular material is not dispersed or blown away, but instead remains under the influence of the arcs, and further the double arcs allow time for more complete melting and mixing of the alloy materials.

In addition, and in accordance with the present invention, the arcs may be oscillated transversely of the direction of travel of the electrodes, hence a wider weld bead is produced and if the feed tube is oscillated the granular material is not all deposited in the center of the bead, but instead is spread out to give better mixing and distribution.

A further object of the present invention lies in the ability to use therewith either gas shielding, particulate mineral shielding, or no shielding.

Other and further objects, features, and advantages will be apparent from the following description of presently-preferred embodiments of the invention, given for the purpose of disclosure, taken in conjunction with the accompanying drawings, where like character references designate like parts throughout the several views, and where FIGURE 1 is a partial sectional side view of an apparatus suitable for use with the invention, FIGURE 2 is a partial front view of the dual electrodes and alloy metal feed tube, FIGURE 3 is a sectional view taken along the line 3—3 of FIGURE 2, and FIGURE 4 is a partial sectional view of a modified form of the present invention, particularly adapted to gas shielding.

The invention generally comprises an improved metered arc welding apparatus and method, and includes means to feed two electrodes so as to maintain two arcs side by side, means to move the electrodes forwardly, means to deposit a metered quantity of alloy granules in the puddle ahead of and between the two electrodes in proportion to the electrode, and may include means to oscillate the electrodes transversely of the deposited layer as the weld bead is formed.

The method of the present invention generally comprises the steps of moving and feeding a pair of electrodes over a surface to be welded, depositing a metered stream of alloy granules into the puddle formed by the arc between the electrodes, oscillating the electrodes transversely as they move over the surface, while maintaining arcs between both electrodes to the deposited layer on the surface to be welded. The method may also include shielding steps.

Referring now to the drawings, the reference numeral 10 generally designates the surface which is to be welded, clad, hard faced, or the like. Suspended above the surface 10 is the welding head 12 which generally includes a feeder 14 for granular alloying materials, as well as shielding materials; interconnecting means 15; electrode feeding rollers 16; reciprocating means R for oscillating the electrodes in a manner to be hereinafter disclosed, and a coil of electrode wire 18. The welding head 12 may be supported by the wheel 20 which is rotatably mounted in the bracket 22, which is in turn pivotally mounted to the welding head 12 by means of a pivotal connection 24, as well as by the boom 28 about which the welding head 12 may be oscillated at the pivotal mounting means 30. The boom 28 may extend from an automatic welding machine, or it may be a portion of a hand-held bar for semi-automatic operation by a welder. Other conventional support means may be utilized.

The feeder 14 as well as the mineral shield tube 32, granular alloy material tube 34, and electrode nozzle 36 may generally be made in any conventional manner and to this end reference is made to my Patents No. 3,060,307 and No. 3,172,991, both of which disclose apparatus and materials generally suitable for the purposes of the present invention, except as hereinafter modified. The interconnecting means 15 assures a constant proportion between the electrode feed by the rollers 16 and the metered alloy material feed by the feeder 14.

Referring now to FIGURE 2, wherein a front view of the electrode nozzles 36 and granular alloying material feed tube 34 is shown, it is to be particularly noted that the feed tube 34 is so situated as to deposit the metered alloying materials 38 between the two electrodes 40 which extend from the nozzles 36. The arcs extend from the electrodes 40 to the puddle of alloying metal 38 upon which the weld 42 is formed.

As can be seen in FIGURE 3, the feed tube 34 is situated in front of the two electrodes 40, although depending upon the spacing of the electrodes, and the particular granular material being deposited, it may be found advantageous to place the exit of the feed tube 34 between the electrodes.

Further, and with reference to FIGURE 4, it may be desirable to incline the electrodes in the direction of movement as well as to direct the exit of the feed tube 34 to some point between the electrodes. FIGURE 4 also illustrates a gas shield 44 surrounding the electrodes and feed tube 34, having an appropriate gas inlet 46 leading thereto. A fuller explanation of such gas shielding may be found in such patents as 3,102,025 and 2,727,125. Of course, instead of gas, the same arrangement may be utilized for mineral shielding, such as was disclosed in my Patent No. 3,172,991.

Additionally, and with reference again to FIGURE 1, instead of a concentric gas shield 44, which encloses the nozzles 36 and the alloy feed tube 34, mineral shielding may be employed by feeding particulate mineral material from the tube 32 at the electrodes 40. Thus, it is seen that the present invention may be utilized with open arc welding, as well as with gas shielding and mineral shielding.

Operation of the reciprocating means R results in reciprocation of the link 48 which in turn will pivot the welding head 12 about the pivotal means 30 resulting in the motion shown in the arrows in FIGURE 2. The pivotal connection 24 for the roller support 20 allows this roller to function to continue to support the welding head 12 at an appropriate distance even while the head is reciprocating as indicated. It is to be particularly noted that the alloy feed tube 34 reciprocates with the nozzles 36 and electrodes 40, hence the metered granular alloying material 38 is dispersed over a wider area than would be possible if it did not reciprocate, and at the same time, and most importantly, the granular material is always deposited between the arcs from the electrodes 40, and hence is not blown away by arc blast, or otherwise dispersed. The present invention advantageously allows the use not only of an A.C. arc, but also a D.C. arc of both positive and reverse polarity.

It might also be mentioned that the present invention is adaptable for use without oscillation transversely of the weld bead 42, and because of the presence of two arcs, the granular material 38 need not be positioned so critically, because the arcs will traverse either side of a pile of granular material, thus maintaining it in position, as differentiated from a single arc which tends to blow the material away.

Thus, it is seen that the present invention has provided an apparatus and method for arc welding, which is suitable not only for automatic equipment, but also for semi-automatic equipment and which may be used not only with open arc with no shielding, and open arc with gas shielding, but also with mineral shielding and which utilizes dual arcs with the granular alloying material deposited therebetween to provide more complete mixing and melting.

The present invention, therefore, is well adapted to carry out the objects and attain the ends and advantages mentioned, as well as others inherent therein. While presently preferred embodiments of the invention have been given for the purpose of disclosure, numerous changes in the details of construction, and the combination, shape, size, arrangement of parts, and uses may be resorted to without departing from the spirit and scope of the invention as hereinafter claimed.

What is claimed is:
1. The method of welding a surface including:
moving a pair of electrodes over the surface,
depositing a layer of alloy granules in a puddle ahead of and between the electrodes,
oscillating the pair of electrodes transversely of the deposited layer as they travel thereover, and
maintaining arcs from both electrodes to the deposited layer on the surface, thereby forming the puddle and welding the surface.
2. The invention of claim 1 including the step of:
shielding the arcs while maintaining the arcs.
3. The method of welding a surface including:
suspending a feed tube and a pair of electrodes above the surface,
moving the tube and electrodes over the surface,
directing a metered supply of alloy granules into the feed tube,
depositing the granules from the tube into a puddle ahead of and between the electrodes,
maintaining arcs from both electrodes to the deposited puddle formed on the surface, and
feeding additional electrode material as it is consumed in the arcs.
4. The invention of claim 3 including the step of:
oscillating the feed tube and electrodes transversely as they are moved over the surface.
5. The invention of claim 3 including the step of:
shielding the arcs while maintaining the arcs.
6. A device for forming a puddle and welding on a surface including:
a welding head,
means suspending the head over the surface,
a pair of spaced electrode nozzles depending from the head,
a feed tube depending from the head and mounted in front of and between the nozzles,
means for moving the welding head,
a welding electrode extending from each nozzle,
means for supplying additional electrode as each is consumed, and
means for depositing alloy granules in the puddle formed between the electrodes through the feed tube.
7. The invention of claim 6 including:
means for oscillating the feed tube and nozzles as the welding head is moved.
8. The invention of claim 6 including:
means for environmentally shielding the welding electrodes.

References Cited by the Examiner
UNITED STATES PATENTS

| | | | |
|---|---|---|---|
| 2,669,640 | 2/1954 | Outcall | 219—76 |
| 3,019,327 | 1/1962 | Engel | 219—76 |
| 3,051,822 | 8/1962 | Bernard et al. | 219—74 |

RICHARD M. WOOD, *Primary Examiner.*